(12) United States Patent
Komatsu et al.

(10) Patent No.: US 7,679,824 B2
(45) Date of Patent: Mar. 16, 2010

(54) POLARIZING DEVICE, CROSS DICHROIC PRISM, LIQUID CRYSTAL PROJECTOR, AND METHOD FOR FABRICATING POLARIZING DEVICE

(75) Inventors: Takuya Komatsu, Tochigi (JP); Shigeru Kato, Tochigi (JP)

(73) Assignee: Fujinon Corporation, Saitama-shi (JP)

( * ) Notice: Subject to any disclaimer, the term of this patent is extended or adjusted under 35 U.S.C. 154(b) by 520 days.

(21) Appl. No.: 11/617,254

(22) Filed: Dec. 28, 2006

(65) Prior Publication Data

US 2007/0153381 A1 Jul. 5, 2007

(30) Foreign Application Priority Data

Jan. 5, 2006 (JP) ............................. 2006-000560

(51) Int. Cl.
*G02B 5/30* (2006.01)

(52) U.S. Cl. .................... 359/500; 353/20; 349/96

(58) Field of Classification Search ....................... None
See application file for complete search history.

(56) References Cited

U.S. PATENT DOCUMENTS

| | | | |
|---|---|---|---|
| 6,583,929 B2 * | 6/2003 | Hayashi | 359/491 |
| 6,619,800 B1 * | 9/2003 | Takezawa et al. | 353/20 |
| 7,108,897 B2 * | 9/2006 | Oiso et al. | 428/1.31 |
| 2003/0173035 A1 * | 9/2003 | Yamaguchi | 156/580 |

FOREIGN PATENT DOCUMENTS

JP        2000352615 A  * 12/2000

* cited by examiner

*Primary Examiner*—Lee Fineman
(74) *Attorney, Agent, or Firm*—Oblon, Spivak, McClelland, Maier & Neustadt, L.L.P.

(57) ABSTRACT

A polarizing device having a synthetic resin film of a polarizing plate sandwiched and bonded between two glass members. At least a surface on one side of the polarizing plate is bonded to one of glass members by the use of a tackiness agent. Adjoining surfaces of the two glass members, which are located on the side of the sandwiched polarizing plate, are finished to a high degree of planeness, and at least one of the two glass members is in the form of a resilient glass plate capable of flexural deformation in a lateral direction.

9 Claims, 4 Drawing Sheets

(a)

(b)

(a)

(b)

(a)

(b)

POLARIZING DEVICE, CROSS DICHROIC PRISM, LIQUID CRYSTAL PROJECTOR, AND METHOD FOR FABRICATING POLARIZING DEVICE

BACKGROUND OF THE INVENTION

1. Field of the Art

This invention relates to a polarizing device with a high degree of planeness, cross dichroic prism and liquid crystal projector applying the polarizing device, and a method for fabricating the polarizing device.

2. Prior Art

There are liquid crystal projectors which employ a liquid crystal display device (an image sensor) for the purpose of projecting a picture image on a screen by way of the liquid crystal display device. Liquid crystal projectors, which are capable of projecting still picture images or movies on a large screen, are in wide use for presentation purposes or in home theaters. In a liquid crystal projector, a liquid crystal display device plays a role of image modulation in producing a picture image to be projected. Liquid crystal projectors which are capable of projecting color images on a screen can be categorized into two types, i.e., a three-panel type projector employing three liquid crystal display devices and a single-panel type projector employing a single liquid crystal display device. Lately, particularly three-panel type liquid crystal projectors are in general use because of high resolution of projected picture images.

In the case of a three-panel type liquid crystal projector, while light from a light source is separated into blue, green and red light components by color separation using dichroic mirrors and dichroic prism. The respective color components are modulated by the use of a liquid crystal display panel, and resulting image light of the respective color components are synthesized into a color image by the use of a dichroic mirror and a dichroic prism and projected on a screen by a projection lens.

A polarizing plate is located in light paths to and from a liquid crystal display device for the purpose of matching the direction of polarization of input and output light. By a polarizing plate on an input side, light rays of each color incident on a liquid crystal display device is attuned to linearly polarized light vibrating in the plane of polarization of either p- or s-polarization light, and modulated with picture signals of a corresponding wave range, rotating the plane of polarization. Of light rays of each color component which have been transmitted through the liquid crystal displace device, light rays polarized light in a specific direction of polarization alone are transmitted through the polarizing plate which is located on the output side, and the resulting image light of the respective color components are synthesized into a color image by means of a dichroic mirror and a dichroic prism.

Thus, polarizing plates are essential component parts for a liquid crystal projector, and optical accuracy of polarizing plates has a great influence on a picture image to be projected. That is to say, it is important for a liquid crystal projector to employ polarizing plates which are accurate in optical performance quality. Nevertheless, polarizing plates which are made of a synthetic resin film are soft by nature and difficult to maintain a high degree of planeness. In Japanese Laid-Open Patent Application 2000-352615, attempts are made to improve picture quality by solving the problem of irregularities in contrast as caused by polarizing plates. More particularly, in Japanese Laid-Open Patent Application 2000-352615, in order to solve the problem of degradations in contrast attributable to distortions of a synthetic resin film, a polarizing plate is bonded on glass which is small in absolute value of mean linear expansion coefficient As mentioned above, a polarizing plate is made of an inherently soft synthetic resin film. A polarizing film with a polarizing function is bonded with a protective film, so that a resulting polarizing plate is soft as a whole. In Japanese Laid-Open Patent Application 2000-352615 mentioned above, by the use of a tackiness agent, a soft polarizing plate is bonded to a glass member like a prism which is high in rigidity. However, the tack strength of the tackiness agent is not strong enough for perfectly smoothing the surface of a bonded polarizing plate to a high degree of planeness, and more or less undulations remain on the surface, resulting in a polarizing plate which is inferior in surface planeness suffering from problems such as low accuracy in focusing picture images on a screen and low quality of projected picture images.

SUMMARY OF THE INVENTION

In view of the foregoing situations, it is an object of the present invention to impart a high degree of planeness to a polarizing plate at the time of bonding same to a glass member for fabrication of a polarizing device.

According to the present invention, there is provided a polarizing device having a synthetic resin film of a polarizing plate sandwiched and bonded between two glass members using a tackiness agent for a bond to at least one of the glass members; the glass members having a surface finished to a high degree of planeness at least on a side to be bonded with the polarizing plate, and at least one of the glass members being in the form of a resilient glass plate capable of flexural deformation.

Further, as an application of the polarizing device according to the present invention, there is provided a dichroic prism, wherein said polarizing plate of the above-described polarizing device is sandwiched and bonded between an input plane or an output plane of the dichroic prism and the resilient glass plate.

Furthermore, as an application of the dichroic prism according to the present invention, there is provided a liquid crystal projector incorporating the above-described dichroic prism as a color synthesizing cross dichroic prism in an image projection system in combination with a light source and color separating dichroic mirrors.

Further, according to the present invention, there is provided a method of fabricating a polarizing device having a synthetic resin film of a polarizing plate sandwiched between two glass members, with a surface on one side of the polarizing plate bonded to a glass member with a high degree of planeness by the use of a tackiness agent or an adhesive agent and a surface on the opposite side of the polarizing plate bonded to a resilient glass plate having a high degree of planeness and being capable of flexural deformation by the use of a tackiness agent, characterized in that the method comprises the step of: bonding the resilient glass plate to the polarizing plate by holding the resilient glass plate in a flexuously bent form and pressing same against the polarizing plate gradually from one end to the other to straighten with expelling trapped air out of the tackiness agent.

The above and other objects, features and advantages of the present invention will become apparent from the following particular description of preferred embodiments and examples, taken in conjunction with the accompanying drawings. Needless to say, the present invention should not be construed as being limited to particular forms shown in the drawings.

DESCRIPTION OF PREFERRED EMBODIMENTS

Figure 1:
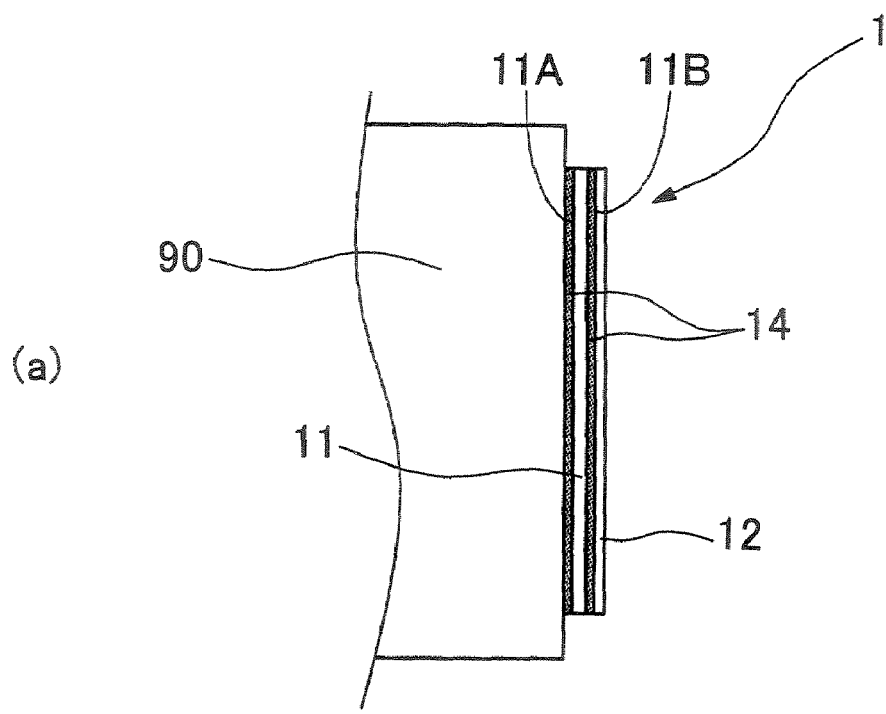
FIG. 1 is a schematic view explanatory of a polarizing device according to the invention and a manner of bonding a resilient glass plate with a polarizing plate.
Figure 1:
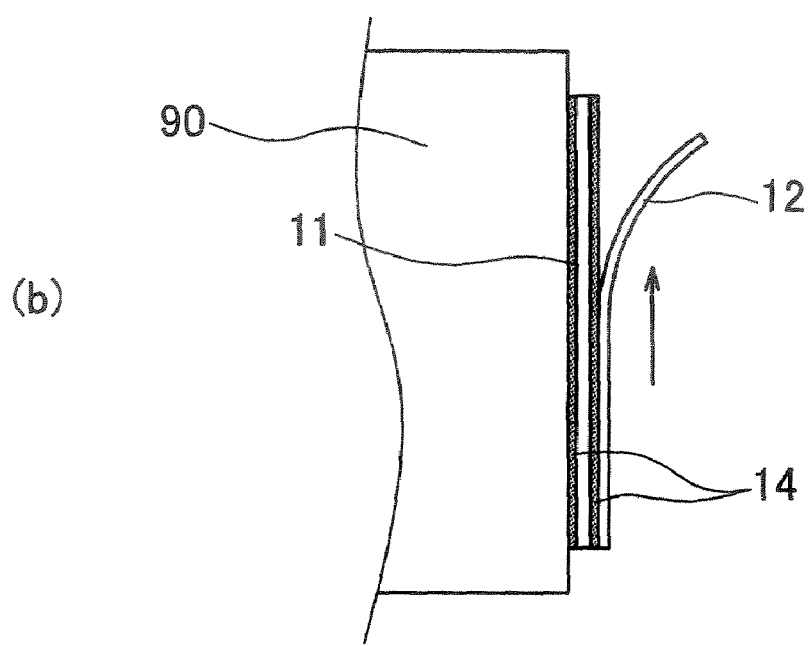

Hereafter, the present invention is described more particularly by way of its preferred embodiments with reference to the accompanying drawings. Shown in FIG. 1(a) is a polarizing device 1 according to the present invention. This polarizing device 1 is of a sandwich construction having a polarizing plate 11 sandwiched between two glass members. Of the two glass members, at least one glass member is in the form of a resilient glass plate which is capable of flexural deformation in a lateral direction. In this instance, the polarizing plate 11 is sandwiched between a rigid glass member 90 and a resilient glass plate 12. As will be described hereinafter, the polarizing plate 11 may be sandwiched between two glass members both of which are in the form of a resilient glass plate.

As shown in FIG. 1(a), the polarizing plate 11 is bonded to the rigid glass member 90 by the use of a tackiness agent or an adhesive agent. In this particular embodiment, by the use of a tackiness agent 14, the rigid glass member 90 is bonded to one side of the polarizing plate 11 (to the left side in FIG. 1(a) which is herein referred to as "an inner side 11A" for the convenience of description), and a resilient glass plate 12 is bonded to the other side of the polarizing plate 11 (to the right side in FIG. 1(a) which is herein referred to as "an outer side 11B" for the convenience of description) by the use of a tackiness agent 14. Surfaces of the resilient glass plate 12 and rigid glass member 90, on the side to be bonded with the polarizing plate 11, are polished beforehand to have an optically high degree of planeness.

The polarizing plate 11 is composed of a polarizing film and a protective film layer which is bonded to the polarizing film. As for example of a polarizing film, a PVA (polyvinyl alcohol) film is impregnated with iodine by immersion in an aqueous solution of iodine, followed by stretching and orientation. A polarizing plate is formed by bonding a protection film layer on a polarizing film, e.g., a film of TAC (Triacetate) or acryl, diacetylcellulose. Thus, the polarizing plate 11 which is composed of film materials is a soft member with stretchability and flexibility.

The resilient glass plate 12 is a glass plate which is resiliently flexible and capable of flexural deformation in lateral directions, and employed for the purpose of imparting a high degree of planeness to the polarizing plate 11. The resilient glass plate 12 can be deformed (flexuously bent) by application of an external force, but it is basically a flat glass plate with a surface which is highly accurate in planeness as mentioned above. Namely, unless an external force is applied, the resilient glass plate 11 restores a flat shape of high planeness by its resilient restoring force. On the other hand, the rigid glass member 90 is a highly rigid glass member which is unsusceptible of deformation, and, for example, in addition to a cross dichroic prism which will be described hereinlater, can be applied as an ordinary dichroic prism having dielectric multilayers not in crossed positions or as a parallel plane glass member. In this instance, from the standpoint of preventing deteriorations by heat, it is desirable to select a material with excellent properties in heat release for the rigid glass member 90 and for the resilient glass plate 12 as well. Here, for example, a high heat release material like a sapphire plate or a quartz plate can be suitably applied.

Here, an adhesive agent or a tackiness agent is employed for boding together two separate members. An intervening adhesive agent plays a role of bonding together two members at least by a mechanical bondage or by physical or chemical interaction, and the adhesive agent cures or hardens itself. When an external force is applied between two bonded members in a shearing direction, the adhesive agent shows a high shearing strength. The adhesive layer is destructed when an external force exceeding the shearing strength is applied. On the other hand, a tackiness agent holds two members in a bonded state by means of a tacky force, and a bond between two members has a predetermined shear storage elastic modulus. Therefore, if an external force is applied between two bonded members in a shearing direction, a shear occurs between the two members to absorb the force in the shearing direction. Thus, by the property of a shear storage elastic modulus, a tackiness agent can be distinguished from an adhesive agent.

Following is the reason why the polarizing plate 11 is sandwiched between the rigid glass member 90 and the resilient glass plate 12 as described above. Namely, the polarizing plate 11, which is bonded to the rigid glass member 90 with a high degree of planeness by means of a tackiness agent, can perform functions of a polarizing plate. However, since the polarizing plate 11 is formed of a soft material like a synthetic resin film and fixed by means of a tackiness agent which is not very high in tack strength, undulations may occur on the surface of the polarizing plate 11, degrading planeness of the polarizing plate and as a consequence degrading quality picture images projected on a screen.

For this reason, the polarizing plate 11 is fixedly bonded between the rigid glass member 90 and the resilient glass member 12 which is securely bonded to the other side of the polarizing plate 11 away from the rigid glass member 90. As mentioned above, the joining surfaces of the rigid glass member 90 and the resilient glass member 12 have a high degree of planeness, so that undulations on a surface of the polarizing plate 11, if any, are smoothened out, and the polarizing plate 11 gripped between such joining surfaces is imparted with a similar high degree of planeness. In this regard, in order to smoothen out undulations and impart a high degree of planeness, one of the two glass members which sandwich the polarizing plate 11 needs to be a resilient glass plate 12.

Namely, in case two rigid glass members are bonded by the use of the tackiness agent 14, it is difficult to smoothen out the tackiness agent 14 perfectly to realize a high degree of planeness of the polarizing plate 11. In order to overcome this problem, the resilient glass plate 12 which is deformable to a lateral side is bonded on the outer side 11B of the polarizing plate 11 by the use of the tackiness agent 14. At this time, since the polarizing plate 11 is a soft pliable member, undulations can occur on its surface even if the resilient glass member 12 is bonded. However, the tackiness agent 14 can be smoothened out to follow the plane surface of the resilient glass member 12 by applying a strong pressing force or a strong rubbing force on the outer side of the resilient glass member 12, that is, the side away from the side which is bonded to the polarizing plate 11. Since the resilient glass member 12 has a high degree of planeness in a natural or free state, the tackiness agent 14 can be smoothened out, following the planeness of the resilient glass member 12.

Further, the use of the resilient glass member 12 has an effect of expelling trapped air in the course of bonding the resilient glass plate 12. There is a possibility that air is trapped in at the time of bonding the polarizing plate 11 with the rigid glass member 90 and the resilient glass plate 12. Entrapment of air will result in degradations in quality of picture images which are transmitted through the polarizing plate 11 and projected on a screen. This is because images of entrapped air bubbles and degradations in planeness affect the picture quality to a considerable degree. Therefore, in order to expel trapped air at the time of bonding the polarizing plate 11, it is important to use the resilient glass member 12 for at least one of the two glass members which sandwich the polarizing plate 11.

As described above, the resilient glass plate 12 is a glass member which is capable of flexural deformation in a lateral direction. The resilient glass plate 12 is held in a flexuously deformed (bent) state at the time of bonding same on the outer side 11B of the polarizing plate 11 which has been bonded on the rigid glass member 90. At this time, as seen in FIG. 1(b), one end of the resilient glass plate 12 is pressed on one end of the polarizing plate 11 with a strong force. The resilient glass plate 12 which is in a flexuously bent state is initially out of contact with the polarizing plate 11 except the pressed end. Then, the resilient glass plate 12 is pressed against the polarizing plate 11 with a strong force progressively from the initially pressed end as indicated by an arrow in FIG. 1(b). Thus, in an unfolding fashion, the resilient glass plate 12 is flattened successively from one end, and entrapped air, if any, can be expelled as the resilient glass plate 12 is bonded progressively from one end to the other. Accordingly, no entrapped air exists when the resilient glass plate 12 is ultimately entirely bonded to the polarizing plate 11.

In this instance, the resilient glass plate 12 is essential part for flattening the polarizing plate 11, and for this purpose it is preferred to be as thin as possible. Namely, in order to expel entrapped air as the resilient glass plate 12 is bonded progressively from one end to the other, it is preferred for the resilient glass plate 12 to be higher in flexural deformation capability. Besides, a resilient glass plate 12 of a smaller thickness can contribute to compactification of the polarizing device as a whole. The resilient glass plate 12 is preferred to be smaller in thickness than the polarizing plate 11 because it can be put in flexural deformation to a greater degree. However, the resilient glass plate 12 may be thicker than the polarizing plate 11 as long as it is capable of flexural deformation in a lateral direction.

Thus, by adoption of the sandwich construction having the polarizing plate 11 sandwiched between the rigid glass member 90 and the resilient glass plate 12 which is capable of flexural deformation in a lateral direction, the polarizing plate 11 gripped between the two glass members can be flattened to a high degree of planeness. In addition, no entrapped air exists between the polarizing plate 11 and the tackiness agent 14 because entrapped air can be expelled as the flexuously bent resilient glass member 12 is bonded progressively from one end to the other.

As shown in FIG. 1(a), the polarizing plate 11 is securely bonded between the rigid glass member 90 and the resilient glass plate 12 using the tackiness agent 14 on each side of the polarizing plate 11. However, instead of using the tackiness agent 14 on both of the inner and outer sides 11A and 11B of the polarizing plate 11, an adhesive agent may be used for bonding either the inner side 11A or outer side 11B of the polarizing plate 11. For example, in FIG. 1(a), a tackiness agent and an adhesive agent may be for bonding the outer and inner sides 11B and 11A of the polarizing plate 11, respectively. Of course, a tackiness agent may be used for bonding the inner side 11A, while using an adhesive agent for the side 11B. However, it is a must to use a tackiness agent on at least one of the inner and outer sides 11A and 11B of the polarizing plate 11. In other words, an adhesive agent should not be used for bonding surfaces on both of the inner and outer sides 11A and 11B of the polarizing plate 11 for the following reason.

In case a synthetic resin film is bonded to a glass member by the use of an adhesive agent, unless the adhesive agent is completely deaerated, distortion occurs to an adhesive layer due to a difference in thermal expansibility when the bonded parts are put in heated conditions, and occluded air can grow into air bubbles. Especially, in case the polarizing plate 11 is to be used as a component part of a liquid crystal projector, it is invariably put in heated conditions because the inside of the projector reaches a high temperature in use. Therefore, grown air bubbles can affect the picture images to be projected on a screen, degrading the picture quality to a conspicuous degree.

In contrast, in case a synthetic resin film is bonded to a glass member by the use of a tackiness agent, an interstratum slippage or deviation can occur between the glass and synthetic resin due to a difference in thermal expansibility when a shearing force is applied to the bonded members under heated conditions. Depending the properties of the tackiness agent, initial conditions can be restored when heat is removed. Utilizing this phenomenon, interstratum stress can be moderated by a shear storage modulus of a tackiness agent suppression of occurrence of air bubbles at the time of bonding together the glass member 90 and the synthetic resin film of the polarizing plate 11 which have a great difference in thermal expansion coefficient.

As described above, at the time of sandwiching the polarizing plate 11 between two glass members, a tackiness agent may be used on both sides of the polarizing plate 11 for adhesion to the respective glass members. Alternatively, an adhesive agent may be used on one side of the polarizing plate 11 for adhesion to one glass member, using a tackiness agent on the other side for adhesion to the other glass member. Any way, it is essential to use a tackiness agent at least on one side of the polarizing plate 11. Thus, according to the present invention, a polarizing plate bonded on a glass member accurately with a high degree of planeness.

EXAMPLE 1

Figure 2:
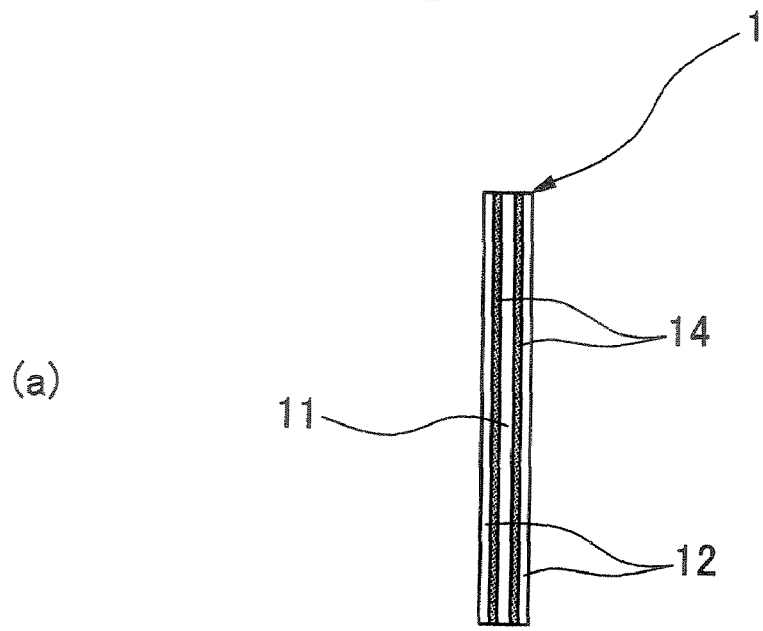
FIG. 2 is a schematic view explanatory of a polarizing device of another embodiment and a modification having a polarizing device bonded on a rigid glass member.
Figure 2:
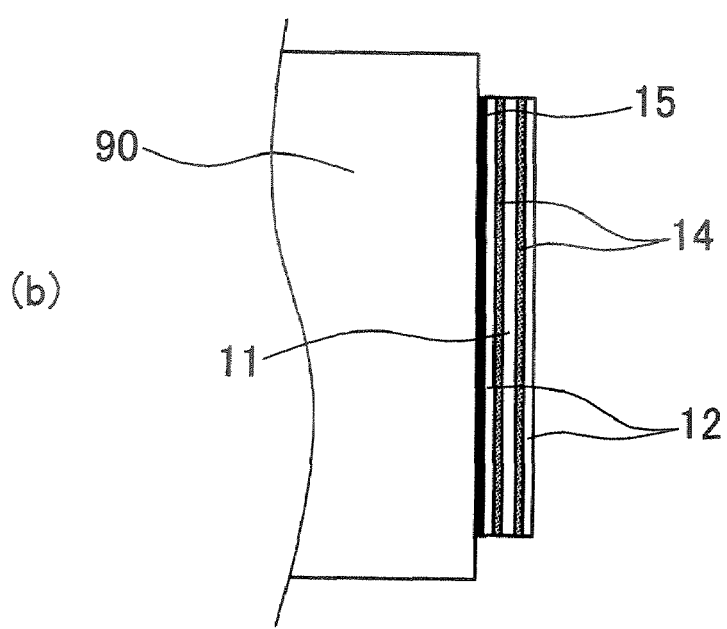

In this Example, a polarizing plate 11 is sandwiched between a couple of resilient glass plates 12, different from the foregoing embodiment having a polarizing plate 11 between a rigid glass member 90 and a resilient glass member 12. As shown in FIG. 2(a), the polarizing device 1 of this Example is sandwiched between two resilient glass plates 12 and bonded to each glass plate 12 by means of a tackiness agent. As mentioned above, each one of the resilient glass plates 12 has a high degree of planeness in a free state, so that the polarizing plate 11 which is sandwiched between the resilient glass plates 12 can be imparted with a similarly high degree of planeness. Besides, trapped air, if any, can be expelled by bonding one resilient glass member 12 which is gradually stretched from a flexuously bent form. Thus, the ultimately obtained polarizing device 1 has a high degree of planeness.

Then, as shown in FIG. 2(b), one side of the polarizing device 1 is bonded with a rigid glass member 90 by the use of an adhesive agent. As the rigid glass member 90, for example, a cross dichroic prism can be applied as mentioned hereinbefore. In this case, the resilient glass plate 12 of the polarizing device 1 is bonded to the rigid glass member 90 by an adhesive agent. However, this time there is no possibility of inviting growth of air bubbles because the rigid glass member 90 and the resilient glass member 12 have no difference in thermal expansion coefficient. Therefore, the polarizing device 1 can be bonded to the rigid glass member 90 by the use of an adhesive agent with a strong adhesion power.

EXAMPLE 2

Figure 3:
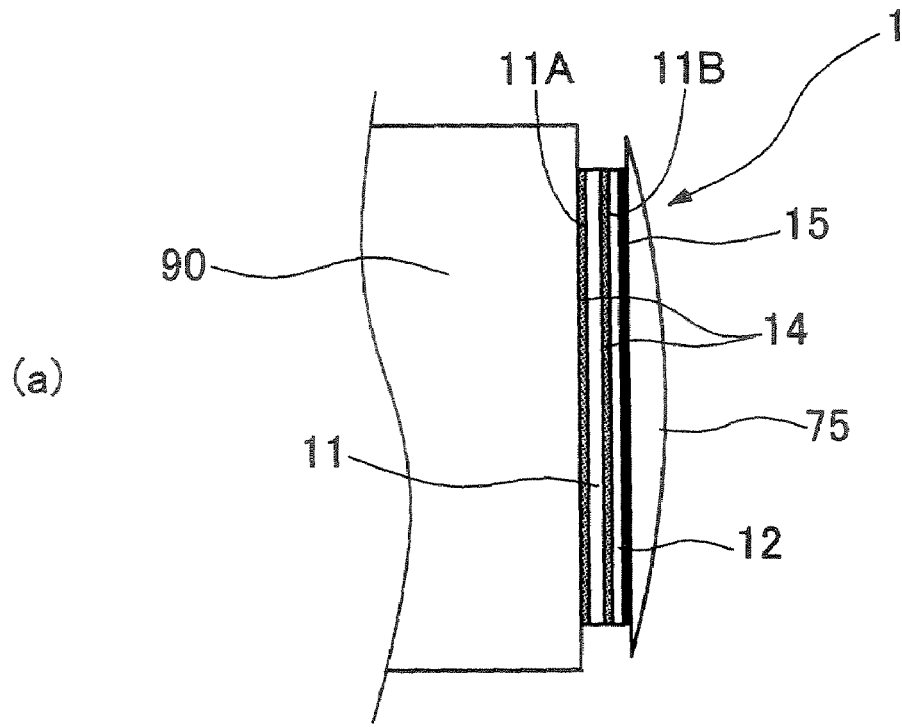
FIG. 3 is a schematic view of a polarizing device with an objective lens affixed on one side thereof.
Figure 3:
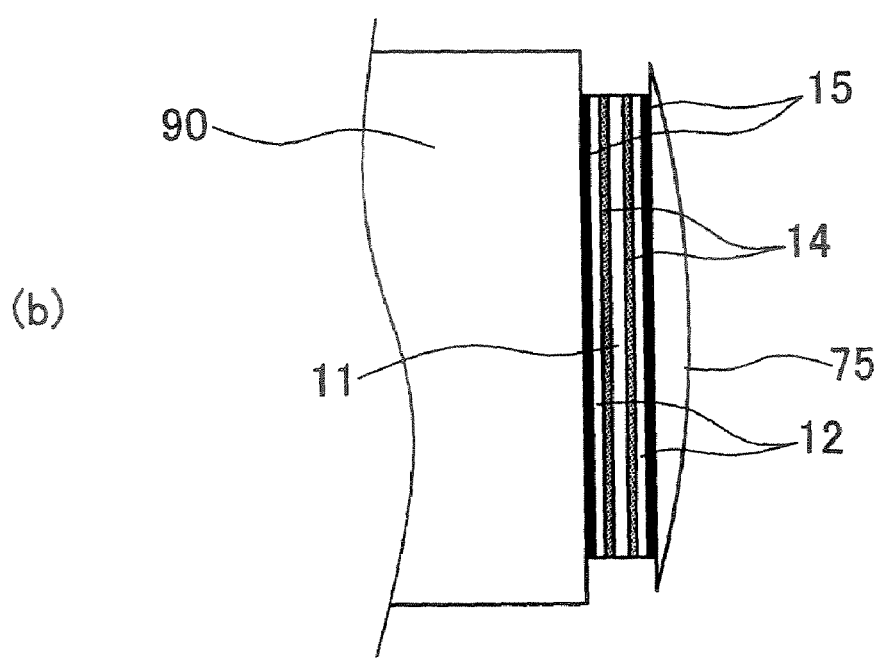

In the next place, an optical element like an optical lens is bonded to the other side of the polarizing device 1 of the above-described embodiment and Example 1, i.e., to the side away from the side which is bonded to the rigid glass member 90. In this Example, more specifically, in the case of FIG. 3(a), an objective lens 75 is bonded to the outer side of the resilient glass plate 12, the inner side of which is bonded to the polarizing plate 11. In the case of FIG. 3(b), a polarizing plate 11 is sandwiched between two resilient glass plates 12, and one resilient glass plate 12 is bonded to a rigid glass member 90 by the use of an adhesive agent 15, on the side away from the side which is bonded to the polarizing plate 11, while an objective lens 75 is bonded to the outer side of the other resilient glass plate 12 the inner side of which is bonded to the polarizing plate 11. In FIG. 3, shown at (a) is an example having an objective lens 75 bonded on a polarizing device 1 of the above-described embodiment, and at (b) an example having an objective lens bonded on a polarizing device 1 of the above-described Example 1. For adhesion to a resilient glass plate 12, the objective lens is of a planoconvex lens.

In both of FIGS. 3(a) and 3(b), an objective lens 75 is affixed to a resilient glass plate 12. A joining surface on the part of the resilient glass plate 12 can have a high degree of planeness. Namely, the joining surface of the resilient glass member 12 which is made of glass can be polished to a high degree of planeness beforehand, similarly to the opposite joining surface which is bonded to the polarizing plate 11. Thus, the rigid glass member 90, polarizing plate 11 and objective lens 75 can be joined into an integral assembly with high optical accuracy by affixing an objective lens 75 to a joining surface of the resilient glass plate 12 polished to a high degree of planeness. For instance, as will be described hereinlater, in a case where a cross dichroic prism is applied as the rigid glass member 90, the cross dichroic prism can be integrally joined with the polarizing plate and objective lens in a highly accurate manner, providing a composite optical component which is compactified as a whole.

In this instance, the resilient glass plate 12 and objective lens 75, both of glass material, do not give rise to the problem of air bubbles mentioned above. In the present Example, an objective lens 75 is affixed to the resilient glass plate 12. If desired, other optical element may be affixed to the resilient glass plate 12. However, an affixing optical element should have a plane surface on the side to be joined with the resilient glass plate 12.

EXAMPLE 3

In this Example, the polarizing device 1 is applied to a liquid crystal projector. In this case, as shown in FIG. 1(a), the polarizing 11 of the sandwich construction having a polarizing plate 11 sandwiched between a rigid glass member 90 and a resilient glass plate 12 is applied to a liquid crystal projector. Here, a cross dichroic prism 140 is applied as the rigid glass member 90.

Figure 4:
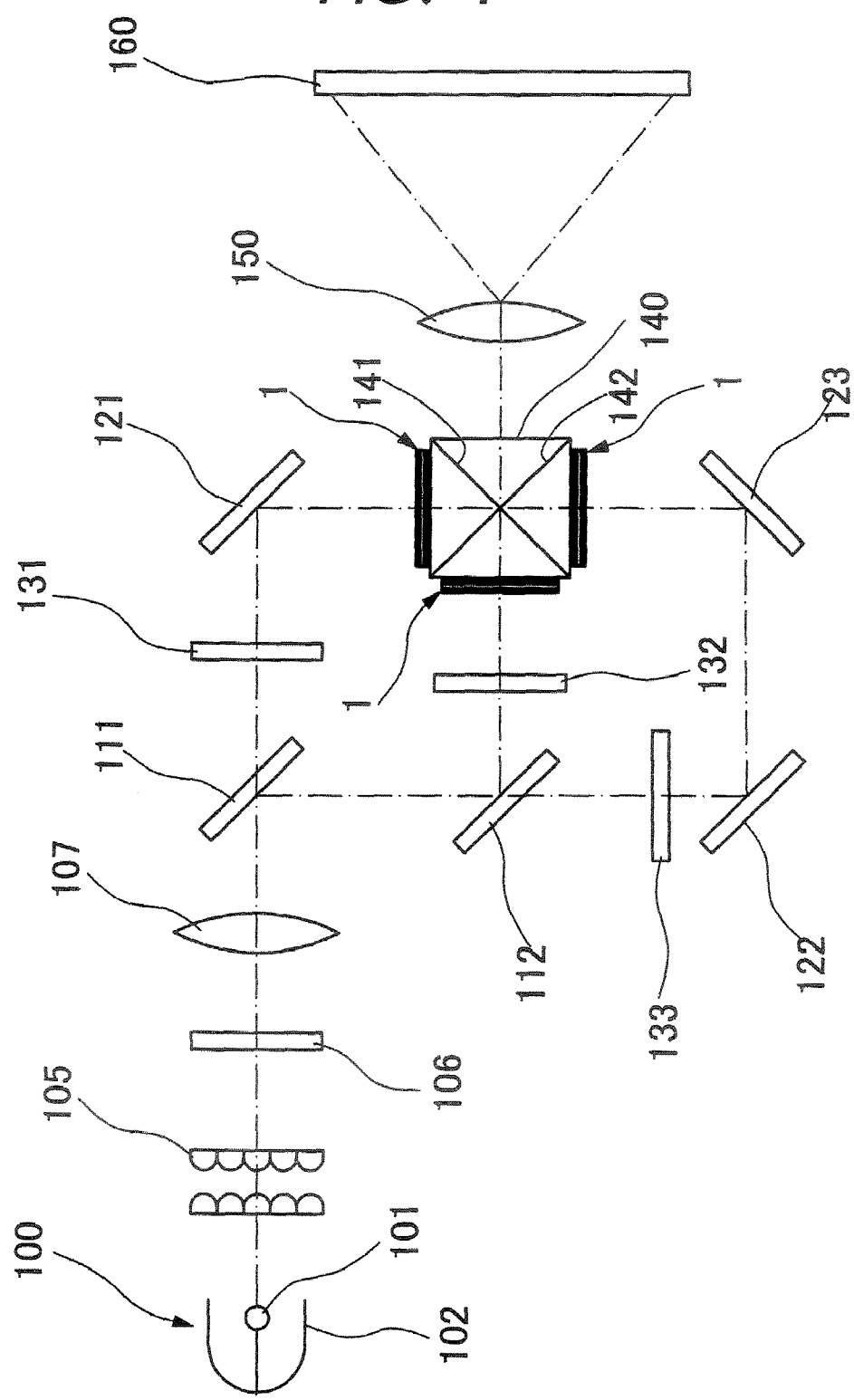
FIG. 4 is a schematic view of an image projection system of a liquid crystal projector incorporating polarizing devices according to the invention.

Shown schematically in FIG. 4 is a liquid crystal projector which is largely constituted by a light source 100, an integrator lens 105, a polarization conversion device 106, a superposing lens 107, a first color separating dichroic mirror 111, a second color separating dichroic mirror 112, a first reflecting mirror 121, a second reflecting mirror 122, a third reflecting mirror 123, a red color illuminating LCD device 131, a green color illuminating LCD device 132, a blue color illuminating LCD device 133, a cross dichroic prism 140, a projection lens 150, and a screen 160. The light source is composed of a light emitter 101 and a reflector 102. White light emitted by the light emitter 101 is reflected by the reflector 102 to project a white light beam forward. The white light beam from the light source 100 is passed through the integrator lens 105 to raise the level of evenness of illumination light, and then transmitted through the polarization conversion device 106. At the polarization conversion device 106, white light is converted to linearly polarized light vibrating in the plane of polarization of either p-polarized or s-polarized light, and fed to the superposing lens 107 which has a function of superposing separate light fluxes or rays in an illuminated range. A light flux coming out of the superposing lens 107 is cast on the first color separating dichroic mirror 111.

The first and second color separating dichroic mirrors 111 and 112 are dichroic mirrors with optical characteristics to transmit or reflect incident light depending upon the wave range. The first color separating dichroic mirror 111 has optical characteristics to transmit red illumination light (light of the red wave range) while reflecting off green illumination light (light of the green wave range) and blue illumination light (light of the blue wave range). The second color separating dichroic mirror 112 has optical characteristics to reflect off green illumination light while transmitting blue illumination light.

Of a white light flux incident on the first color separating dichroic mirror 111, a red illumination light component is transmitted through the dichroic mirror 111 while green and blue illumination light components are reflected off toward the second color separating dichroic mirror 112. Of green and blue illumination light incident on the second color separating dichroic mirror 112, the blue illumination light component is transmitted through the dichroic mirror 112 while the green illumination light component is reflected off. Thus, by the first and second color separating dichroic mirrors 111 and 112, white light from the light source 100 is separated into red, green and blue illumination light components of the three primary colors.

As shown in FIG. 4, the separated red, green and blue illumination light components are modulated into image light containing picture signals, respectively by a red light modulating LCD device 131, a green light modulating LCD device 132 and a blue light modulating LCD device 133. For entrance to the cross dichroic prism 140 red image light (resulting from modulation of the red illumination light component) is reflected by the first reflecting mirror 121, while green image light (resulting from modulation of the green illumination light component) is directed straight forward and blue image light (resulting from modulation of the blue illumination light component) is reflected by the second and third reflecting mirrors 122 and 123.

Formed on the cross dichroic prism 140 are a first dichroic coating 141 with optical characteristics to reflect blue image light alone and a second dichroic coating 142 with optical characteristics to reflect red image light alone. The cross dichroic prism 140 has the polarizing device 1 of the above-described embodiment bonded on each one of the three planes of incidence of the image light of the red, green and blue colors. On entering the cross dichroic prism 140, the plane of polarization of each one of red, green and blue image light is regulated by the polarizing device 1. The blue image light is reflected by the first dichroic coating 141, the red image light is reflected by the second dichroic coating 142 and the green image light is transmitted straight forward, and a color image is synthesized from the image light of these three primary colors and projected on the screen 160 by the projection lens 150.

In this instance, polarizing actions of the polarizing devices 1 which are bonded on the three planes of incidence of the cross dichroic prism 140 have a great influence on picture images to be projected on the screen 160. As described in the foregoing embodiments, a high degree of planeness is imparted to the polarizing plate 11 of each polarizing device 1, a soft member by nature, by sandwiching same between two glass members one of which is in the form of a resilient glass plate 12 capable of flexural deformation in a lateral direction, and using a tackiness agent at least on one side of the polarizing plate 11. Thus, it becomes possible to prevent degradations in quality of picture images to be projected on the screen 160.

The liquid crystal projector shown in FIG. 4 is only an example of application, and the polarizing device 1 according to the invention can be applied to any other liquid crystal projector incorporating a cross dichroic prism 140. Of course, the polarizing device 1 can be applied to an optical component other than a cross dichroic prism in case a polarizing device is bonded on that optical component. For example, the polarizing device 1 can be applied to an optical pickup. In such a case, however, the polarizing plate is applied not as a polarizing plate but as a synthetic resin film serving as a λ/4 wave plate. Further, although the polarizing device 1 of the above-described embodiment is applied in this Example, it is to be noted that the polarizing device 1 of Example 1 or 2 can be similarly applied.

What is claimed is:

1. A polarizing device having a polarizing film in the form of a flexible synthetic resin film sandwiched and bonded between two glass members using a tackiness agent for a bond to at least one of said glass members;

said glass members having a plane adjoining surface at least on a side to be bonded with said polarizing film, and at least one of said glass members being in the form of a resilient glass plate configured to perform a flexural deformation when an external force is applied thereon, and configured to restore to an original flat shape by its own restorative force when relieved of said external force, causing said tackiness agent to smooth out by following said plane adjoining surface of said resilient glass member.

2. A polarizing device as defined in claim 1, wherein the glass member other than said resilient glass plate is in a form of a rigid glass plate, said polarizing film being bonded to both of said resilient glass plate and said rigid glass plate by a tackiness agent.

3. A polarizing device as defined in claim 1, wherein the glass member other than said resilient glass plate is in a form of a rigid glass plate, said polarizing film being bonded to said rigid glass plate on one side by an adhesive agent and to said resilient glass plate on the other side by a tackiness agent.

4. A polarizing device as defined in claim 1, wherein said two glass members are both resilient glass plates, said polarizing film is sandwiched and bonded between two resilient glass plates, one of which resilient glass plates having a surface on the side away from said polarizing plate bonded to a rigid glass member by an adhesive agent.

5. A dichroic prism integrating the polarizing device of claim 4, wherein one of said two resilient glass plates of said polarizing device is bonded to an input or output surface of said dichroic prism by an adhesive agent while the other one of said two resilient glass plates is bonded to a piano-convex lens by an adhesive agent on a side away from said polarizing film.

6. A polarizing device as defined in claim 1, wherein said resilient glass plate is smaller than said polarizing film in thickness.

7. A polarizing device as defined in claim 1, wherein at least one of said glass members is a sapphire plate or a quartz plate.

8. A dichroic prism integrating the polarizing device of claim 1, wherein said glass member other than said resilient glass plate is the dichroic prism itself, said polarizing film being sandwiched between an input plane or an output plane of said dichroic prism and said resilient glass plate which resilient glass plate being smaller than said polarizing film in thickness and bonded to a plano-convex lens on a side away from said polarizing film.

9. A liquid crystal projector incorporating the dichroic prism of claim 8 or 5 as a color synthesizing dichroic prism in an image projection system in combination with a light source and color separating dichroic mirrors.

* * * * *